(12) United States Patent
Mo et al.

(10) Patent No.: US 10,860,712 B2
(45) Date of Patent: Dec. 8, 2020

(54) ENTROPY BASED SECURITY DETECTION SYSTEM

(71) Applicant: VMware, Inc., Palo Alto, CA (US)

(72) Inventors: Zhen Mo, Sunnyvale, CA (US); Dexiang Wang, Sunnyvale, CA (US); Bin Zan, Santa Clara, CA (US); Vijay Ganti, Cupertino, CA (US); Amit Chopra, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 192 days.

(21) Appl. No.: 16/032,349

(22) Filed: Jul. 11, 2018

(65) Prior Publication Data

US 2020/0019698 A1    Jan. 16, 2020

(51) Int. Cl.
  *G06F 21/55* (2013.01)
  *G06F 9/455* (2018.01)
  *G06F 21/57* (2013.01)

(52) U.S. Cl.
  CPC ........ *G06F 21/552* (2013.01); *G06F 9/45558* (2013.01); *G06F 21/57* (2013.01); *G06F 2009/45587* (2013.01)

(58) Field of Classification Search
  CPC ........... G06F 2009/45587; G06F 21/57; G06F 21/552; G06F 9/45558
  See application file for complete search history.

(56) References Cited

U.S. PATENT DOCUMENTS

| | | | | |
|---|---|---|---|---|
| 9,692,662 B2 * | 6/2017 | Chan | ..................... | G06F 9/4881 |
| 10,177,998 B2 * | 1/2019 | Parandehgheibi | .. | G06F 3/04842 |
| 10,223,748 B2 * | 3/2019 | Hunter | .................. | G06F 16/285 |
| 10,255,124 B1 * | 4/2019 | Bellingan | ........... | G06F 11/0709 |
| 2016/0080404 A1 | 3/2016 | Kohout et al. | | |
| 2017/0070521 A1 * | 3/2017 | Bailey | ..................... | H04L 43/12 |
| 2017/0090996 A1 | 3/2017 | Birke et al. | | |
| 2017/0277727 A1 * | 9/2017 | Chen | ................... | G06F 16/2465 |
| 2017/0295078 A1 | 10/2017 | Medas et al. | | |

(Continued)

OTHER PUBLICATIONS

Mazzawi, "Anomaly Detection in Large Databases using Behavioral Patterning", Dec. 2017 IEEE 33rd International Conference on Data Engineering, pp. 1140-1149 (Year: 2017).*

(Continued)

*Primary Examiner* — Khalil Naghdali
(74) *Attorney, Agent, or Firm* — Patterson + Sheridan, LLP

(57) ABSTRACT

A virtual computing instance (VCI) is protected against security threats by a security manager, monitoring a behavior of a VCI over an observation period. The method further includes, storing by the security manager a digital profile in a first database, wherein the digital profile comprises information indicative of the behavior. The method further includes, accessing by a detection system, the digital profile from the first database, and accessing by the detection system, an intended state associated with VCI, wherein the intended state comprises information indicative of a behavior from a second VCI. The method further includes, comparing at least part of the digital profile to the at least part of the intended state. The method further includes, determining by the detection system, that the VCI contains a security threat when information indicative of a behavior in the digital profile is an outlier.

17 Claims, 4 Drawing Sheets

(56) References Cited

U.S. PATENT DOCUMENTS

| | | | |
|---|---|---|---|
| 2018/0020015 A1 | 1/2018 | Munro et al. |
| 2018/0173894 A1 | 6/2018 | Boehler et al. |
| 2018/0324199 A1 | 11/2018 | Crotinger et al. |
| 2020/0174867 A1 | 6/2020 | Mo et al. |
| 2020/0186409 A1 | 6/2020 | Mo et al. |

OTHER PUBLICATIONS

Jerome H. Friedman, "Greedy Function Approximation: A Gradient Boosting Machine", Annals of Statistics, 2000.
Quick Introduction to Boosting Algorithms in Machine Learning, https://www.analyticsvidhya.com/blog/2015/11/quick-introduction- boosting-algorithms-machine-learning, 2015.
Yoav Freund, Robert E. Schapire, "A decision-theoretic generalization of on-line learning and an application to boosting", Journal of Computer and System Sciences, 1997.
Tianqi Chen and Carlos Guestrin, XGBoost: A Scalable Tree Boosting System, Proceedings of the 22Nd ACM SIGKDD International Conference on Knowledge Discovery and Data Mining, 2016.
Shannon, C. E., "A Mathematical Theory of Communication", Bell System Technical Journal, 1948.
Attack: Microsoft Windows LSASS Memory Corruption, https://www.symantec.com/security_response/attacksignatures/detail.jsp?a sid=22582.
Shu Wu, Shengrui Wang, "Information-Theoretic Outlier Detection for Large-Scale Categorical Data", IEEE Transactions on Knowledge and Data Engineering, 2013.
Zhihua Zhou, "Ensemble Methods: Foundations and Algorithms," Chapman & Hall/CRC, 2012.
Series M: TMN and Network Maintenance: International Transmission Systems, Telephone Circuits, Telegraphy, Facsimile and Leased Circuits, Feb. 2000, ITU, M.3400.

\* cited by examiner

ENTROPY BASED SECURITY DETECTION SYSTEM

BACKGROUND

Software defined networking (SDN) comprises a plurality of hosts in communication over a physical network infrastructure, each host having one or more virtual computing instances (VCIs) such as virtual machines (VMs) or containers that are connected to logical overlay networks that may span multiple hosts and are decoupled from the underlying physical network infrastructure. Applications running on such VMs are susceptible to malicious attacks. Though certain embodiments are discussed herein with respect to VMs, it should be noted that other virtual computing instances, or in some cases, other user devices, may be used.

A malicious attack (e.g., such as performed by malware) on a VM often attacks the application level (e.g., by spreading through the operating environment of the VM, introducing new processes, manipulating processes to communicate with new insecure devices, etc.). AppDefense™ from VMware, Inc. in Palo Alto, Calif. is a product that aims to protect against malicious attacks on VMs and cloud environments. AppDefense™ is a data center endpoint security product that protects applications running on VMs in logical networks. AppDefense™ verifies behaviors of a VM (e.g., actions of a process, including one or more known processes, unwanted processes, and/or changed processes) using a data set generated from one or more past behaviors of the VM (or a behavior history) and including information indicating the one or more past behaviors. An unwanted behavior on a VM is a security threat. It will be appreciated that a behavior of a VM, for example, includes one or more features (e.g., the remote address of the connection, the remote port number of the connection, the outbound or inbound connection type, local address of the connection, the local port number of the connection, and protocol information (e.g., TCP, UDP, etc.)).

A security manager (e.g., AppDefense™) is typically installed in virtualization software (e.g., a hypervisor) to provide an isolated location where it can monitor one or more behaviors of a VM over a period of time (or observation period) and generate a data set (or a digital profile) of the VM including information indicating the one or more behaviors. A security manager detects a security threat when, for example, a behavior indicated in the digital profile is not indicated in a behavior history for the VM.

It will be appreciated that before a security manager can protect a VM using a behavior history, the security manager needs to generate the behavior history. A behavior history can be generated by the security manager in a discovery mode. In the discovery mode, a security manager monitors a VM over a period of time (or learning period), which is typically a few weeks. In certain aspects, a security manager is located in a data center (e.g., a cloud data center) and uses an appliance (e.g., a security appliance) running on the hypervisor layer of a VM to monitor one or more behaviors of the VM over the learning period. The security manager then uses the one or more behaviors monitored during the learning period to generate a behavior history for that VM.

Using a short learning period to generate a behavior history may be desirable because the security manager can begin to protect a VM with the behavior history sooner (or enter a protection mode). Unfortunately, a short learning period can generate an undesirable amount of false alarms. For example, false alarms occur when a non-malicious behavior was not observed during a short discovery mode, and is first observed during a protection mode. The security manager will identify the non-malicious behavior as an unwanted behavior (or a security threat). Typically, using a learning period of about two weeks is sufficient to prevent an undesirable amount of false alarms. A long learning period (e.g., at least two weeks) may also be problematic because it leaves a VM unprotected as any malicious behaviors observed during the learning period go unchecked and become part of a behavior history used for the protection mode of the VM. In this case, the security manager will not identify a malicious behavior as a security threat because the digital profile of the VM and the behavior history of the VM both contain information indicating the malicious behavior. A VM may also be compromised at the time of creation. In this case, even a short learning period remains susceptible to including malicious behaviors in a behavior history for a VM. Thus, there exists a need for more robust security measures.

BRIEF DESCRIPTION OF THE DRAWINGS

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1A:
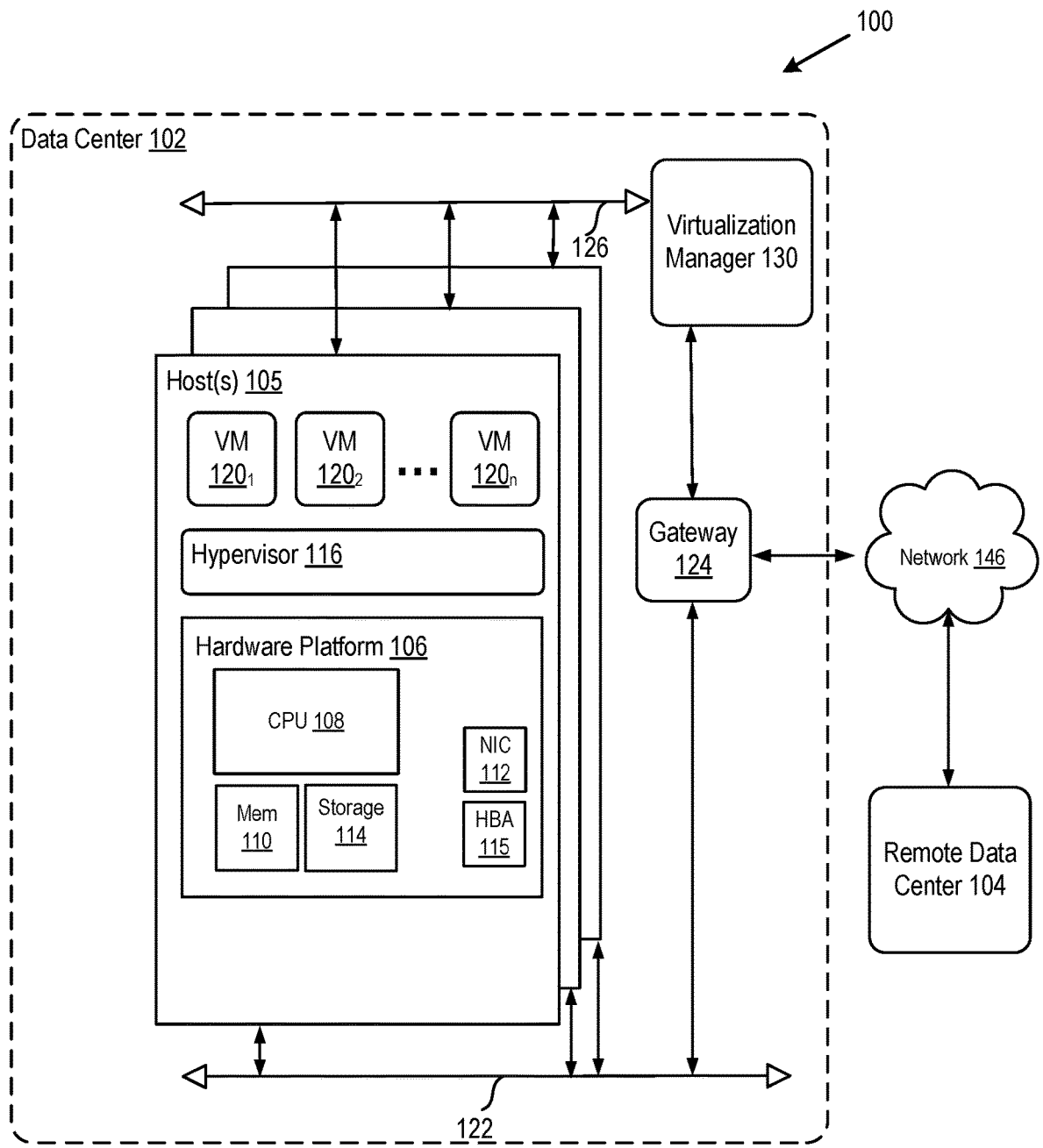
FIG. 1A is a block diagram illustrating a computing system in accordance with certain aspects of the disclosure.

FIG. 1A depicts a block diagram of a computer system 100 in accordance with the disclosure. Data center 102 may be a local data center or a cloud data center (e.g., Amazon Web Services (AWS), Google Cloud, etc.). Data center 102 includes host(s) 105, a gateway 124, a virtualization manager 130, a management network 126, and a data network 122. Each of hosts 105 is typically on a server grade hardware platform 106, such as an x86 architecture platform. Hosts 105 may be geographically co-located servers on the same rack or on different racks in any location in data center 102.

Host 105 is configured with a virtualization layer, referred to here as hypervisor 116, that abstracts processor, memory, storage, and networking resources of hardware platform 106 into multiple virtual machines $120_1$ to $120_n$ (collectively referred to as VMs 120 and individually referred to as VM 120). VMs on the same host 105 may use any suitable overlaying guest operating system(s) and run concurrently with the other VMs.

Hypervisor 116 architecture may vary. In some aspects, hypervisor 116 can be installed as system level software directly on the hosts 105 (often referred to as a "bare metal" installation) and be conceptually interposed between the physical hardware and the guest operating systems executing in the VMs. Alternatively, hypervisor 116 may conceptually run "on top of" a conventional host operating system in the server. In some implementations, hypervisor 116 may comprise system level software as well as a privileged VM machine (not shown) that has access to the physical hardware resources of the host 105. In this implementation, a virtual switch, virtual tunnel endpoint (VTEP), etc., along with hardware drivers, may reside in the privileged VM. One example of hypervisor 116 that may be used is a VMware ESXi™ hypervisor provided as part of the VMware vSphere® solution made commercially available from VMware, Inc. of Palo Alto, Calif.

Hardware platform 106 of each host 105 includes components of a computing device such as one or more processors (CPUs) 108, a system memory 110, a network interface 112, a storage system 114, a host bus adapter (HBA) 115, and other I/O devices such as, for example, a mouse and keyboard (not shown). CPU 108 is configured to execute instructions, for example, executable instructions that perform one or more operations described herein and that may be stored in memory 110 and in storage 114. Network interface 112 enables host 105 to communicate with other devices via a communication medium, such as data network 122 and/or management network 126. Network interface 112 may include one or more network adapters or ports, also referred to as Network Interface Cards (NICs), for connecting to one or more physical networks. Gateway 124 (e.g., executing as a virtual appliance) provides VMs 120 and other components in data center 102 with connectivity to network 146 used to communicate with other devices (e.g., remote data center 104). Gateway 124 manages external public IP addresses for VMs 120 and routes traffic incoming to and outgoing from data center 102 and provides networking services, such as firewalls, network address translation (NAT), dynamic host configuration protocol (DHCP), and load balancing. Gateway 124 uses data network 122 to transmit data network packets to hosts 105. In certain embodiments, data network 122 and management network 126 may be different physical networks as shown, and the hosts 105 may be connected to each of the data network 122 and management network 126 via separate NICs or separate ports on the same NIC. In certain embodiments, data network 122 and management network 126 may correspond to the same physical network, but different network segments, such as different subnets or different logical VLAN segments.

System memory 110 is hardware for allowing information, such as executable instructions, configurations, and other data, to be stored and retrieved. Memory 110 is where programs and data are kept when CPU 108 is actively using them. Memory 110 may be volatile memory or non-volatile memory. Host bus adapter (HBA) couples host 105 to one or more external storages (not shown), such as a storage area network (SAN) or a distributed virtual SAN. Other external storages that may be used include a network-attached storage (NAS) and other network data storage systems, which may be accessible via NIC 112. Storage system 114 represents persistent storage device(s). Storage 114 may be one or more hard disks, flash memory modules, solid state disks, and/or optical disks. Data on storage disks of storage 114 may be organized into blocks, and each block on storage system 114 may be addressable. Although storage 114 is shown as being local to host 105, storage 114 may be external to host 105, such as by connection via HBA 115.

Virtualization manager 130 communicates with hosts 105 via a network, shown as a management network 126, and carries out administrative tasks for data center 102 such as managing hosts 105, managing local VMs 120 running within each host 105, provisioning VMs, migrating VMs from one host to another host, and load balancing between hosts 105. Virtualization manager 130 may be a computer program that resides and executes in a central server in data center 102 or, alternatively, virtualization manager 130 may run as a VM in one of hosts 105. One example of a virtualization manager is the vCenter Server™ product made available from VMware, Inc. Though certain aspects are described herein with respect to VMs, such aspects are also applicable to other types of virtual computing instances, such as containers.

In certain aspects, virtualization manager 130 includes a hybrid cloud management module (not shown) configured to manage and integrate virtualized computing resources provided by remote data center 104 with virtualized computing resources of data center 102 to form a unified computing platform. The hybrid cloud manager module is configured to deploy VMs in remote data center 104, transfer VMs from data center 102 to remote data center 104, and perform other "cross-cloud" administrative tasks. In certain aspects, hybrid cloud manager module is a plug-in complement to virtualization manager 130, although other implementations may be used, such as a separate computer program executing in a central server or running in a VM in one of hosts 105. One example of hybrid cloud manager module is the VMware vCloud Connector® product made available from VMware, Inc.

Figure 1B:
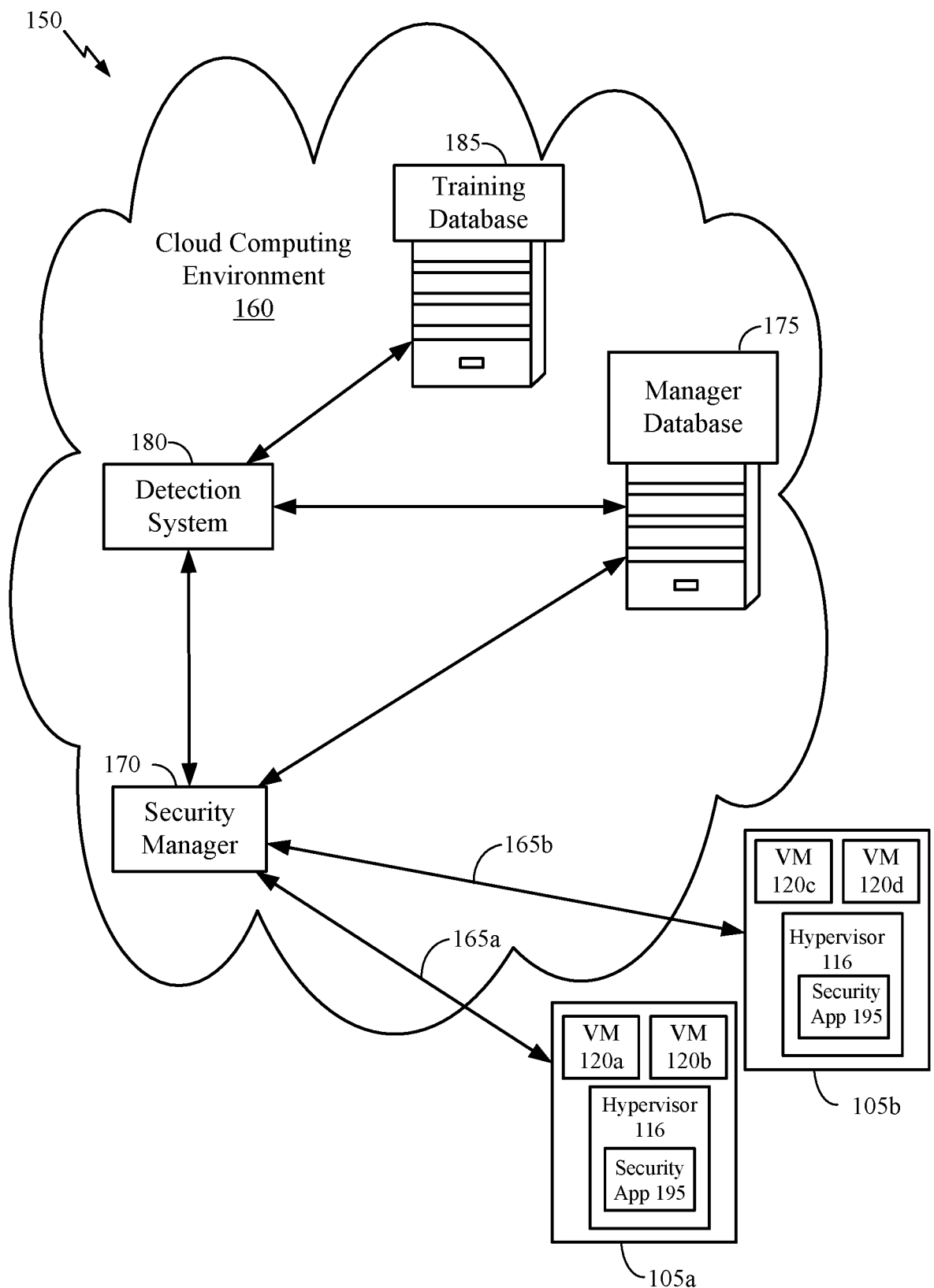
FIG. 1B is a block diagram illustrating a computing system in accordance with certain aspects of the disclosure.

FIG. 1B is a block diagram of a computing system 150, in which certain aspects may be practiced. Computing system 150 includes a cloud computing environment 160, which may be a data center (e.g., data center 102 or remote data center 104 in FIG. 1A). Cloud computing environment 160 includes hardware resources, storage resources, and networking resources (not shown). Hardware resources may include a number of physical servers/hosts (e.g., hosts 105). Storage resources may include a storage area network (SAN), distributed virtual SAN, or network-attached storage (NAS) and other network data storage systems. Networking resources may include switches, routers, and other network devices for connecting hosts together, hosts to storage resources, and hosts with network entities outside cloud computing environment 160.

In one aspect, cloud computing environment 160 is configured as a dedicated cloud service for a single tenant comprised of dedicated hardware resources (i.e., physically isolated from hardware resources used by other users). In other aspects, cloud computing environment 160 is configured as part of a multi-tenant cloud service with logically isolated virtualized computing resources on a shared physical infrastructure. Processes and applications can be executed on the hardware resources of cloud computing environment 160. For example, processes and applications can be directly executed on hosts of cloud computing environment 160, or in VMs or other virtual entities running on hosts of cloud computing environment 160. These processes and application may communicate with one another over the network resources, or may even be located on the same hardware resource.

Computing system 150 includes a plurality of VMs 120 and hypervisors 116 running on one or more hosts (e.g., shown as VMs 120*a*-120*d* running on hosts 105*a*-105*b*) in communication with cloud computing environment 160 through connections 165 (e.g., via a PNIC of hosts 105 and network resources of cloud computing environment 160 (not shown)) to a security manager 170 running as a process/application on hardware resources of cloud computing environment 160. In certain aspects, hosts 105 running VMs 120 are located in the same data center as cloud computing environment 160. In certain aspects, hosts 105 running VMs 120 are located on a separate data center (e.g., data center 102 in FIG. 1A) connected to cloud computing environment 160 through a network (e.g., network 146 in FIG. 1A).

Hypervisors 116 running on hosts 105 include security appliances 195. A security appliance 195 can be prepackaged as part of a hypervisor 116, or may be subsequently added to a hypervisor 116 as additional code/software. Security manager 170 is in communication with security appliances 195 in hypervisors 116 on VMs 120 through connections 165. It will be appreciated that although certain aspects are described with respect to security manager 170 monitoring one or more behaviors of one or more VMs 120 with security appliances 195 (e.g., where security appliances 195 record one or more behaviors of one or more VMs 120 and sends the recorded behaviors to security manager 170), security manager 170 may also monitor the one or more VMs directly without a security appliance 195, and/or also monitor other virtual computing instances, or even physical devices (e.g., with a security appliance 195 running on the same or a separate physical device).

Cloud computing environment 160 further includes a detection system 180 running as a process/application on hardware resources of cloud computing environment 160. Detection system 180 is in communication with security manager 170. Detecting system 180 is in further communication with a manager database 175 and a training database 185. Manager database 175 and training database 185 can be implemented on storage resources of cloud computing environment 160. Security manager 170 is in further communication with manager database 175.

In accordance with certain aspects, detection system 180 uses what is called an "intended state" to detect security threats by comparing a digital profile of a VM (e.g., VM 120) to an intended state associated with the VM. An intended state is a data set comprising information indicative of one or more behaviors that are indicative of a healthy computing environment (e.g., indicative of no unwanted behaviors in the data set). An intended state may also be referred to herein as including the one or more behaviors. It will be appreciated that an intended state is different from a behavior history at least because an intended state associated with a VM is generated at least in part from one or more behaviors monitored on a second VM (or candidate VM), whereas a behavior history for a VM is only applicable to that VM and contains only one or more behaviors from monitoring that VM. It will be appreciated that security manager 170 may generate an intended state in a number of ways as described in more detail below.

In certain aspects, an intended state is generated by security manager 170 after, or concurrently, with monitoring one or more behaviors on one or more VMs 120 over an observation period. The length of the observation period used to generate an intended state is typically on the order of a few weeks, but a shorter or longer time period may be used. In certain aspects, more than one observation period is used, and/or and different observation periods are used for different VMs 120. In certain aspects, security manager 170 monitors each VM separately for generating an intended state. In other aspects, security manager 170 monitors the behavior of a plurality of VMs concurrently for generating an intended state. An intended state is generated by security manager 170 and stored in manager database 175.

In certain aspects, security appliance 195 in hypervisor 116 on host 105a records one or more behaviors of VM 120a and VM 120b over an observation period, and sends the one or more recorded behaviors to security manager 170. Security manager 170 monitors the one or more behaviors sent by security appliances 195, on host 105a and saves information indicative of at least one behavior as an intended state in manager database 175. Generally, the more VMs 120 that are monitored by security manager 170, the more behaviors security manager 170 can use to generate an intended state. In certain aspects, not all behaviors monitored by security manager 170 are used to generate an intended state, as some behaviors may be ignored, for example due to noise (e.g., a certain process may generate erratic behaviors across one or more VMs), frequency of execution (e.g., certain behaviors may not occur often), or are of a low importance for other reasons. In other aspects, all behaviors monitored by security manager 170 are used to generate an intended state.

In certain aspects, an intended state may be associated with a particular VM 120 based on a similarity between a VM 120 and the one or more VMs 120 used to generate the intended state. In certain aspects, the similarity is based at least in part on one or more VM configurations (e.g., similarity of host, applications, connections, permissions, etc.). In certain aspects, security manager 170 generates an intended state for all VMs 120, and/or an intended state for a subset of VMs 120.

In certain aspects, generating an intended state includes generating an intended state by security manager 170 monitoring the behavior of one or more VMs 120 executing one or more known processes (e.g., an operating system process (e.g., a Microsoft Windows operating system process)). It will be appreciated that in certain aspects an operating system process may be monitored by security manager 170 for generating an intended state because it may occur with a higher frequency and commonality between VMs 120 than other processes. It will be appreciated that operating system processes are also commonly attacked with malicious software. In certain aspects, VMs 120 have different behaviors for the same process because they have different VM configurations, and security manager may generate an intended state using one or more of the different behaviors.

In certain aspects, security manager 170 monitors one or more behaviors of VM 120a and VM 120b and generates an intended state based at least in part on the one or more behaviors of VM 120a and VM 120b. In certain aspects, security manager 170 stores an intended state associated with VM 120a and VM 120b in manager database 175. Detection system 180 uses the intended state generated by security manager 170 to detect security threats for a new VM 120c. Thus, in certain aspects, the new VM 120c is protected from certain security threats. It will be appreciated that in certain aspects, a behavior history of VM 120c is not needed by detection system 180 to determine a security threat for VM 120c. It will be appreciated that VM 120c may be a newly configured VM 120c that may lack a behavior history. In other aspects, one or more behaviors from a first behavior history for VM 120c may be combined with a first intended state associated with VM 120c and stored as a second intended state associated with at least VM 120c in manager database 175 or as a second behavior history for VM 120c in training database 185.

In certain aspects, an intended state is generated by security manager 170 by monitoring one or more behaviors on one or more VMs 120 executing one or more selected (or candidate) processes. It will be appreciated that candidate processes that are likely to occur within a typical observation period (e.g., two week) are preferable for generating an intended state. It will be further appreciated that with respect to selecting one or more candidate processes, certain operating system processes are known for malicious network attacks (e.g., Microsoft Windows operating system processes including: lsass.exe, services.exe, spoolsv.exe, svchost.exe-k LocalService, svchost.exe-k netsvcs, svhost.exe-k NetworkService, svchost.exe-k utcsvc, etc.). Therefore, in certain aspects, one or more candidate processes known for malicious network attacks are selected to run on a plurality of virtual machines (e.g., VMs $120_1$ through $120_n$ in FIG. 1A) and security manager 170 may generate an intended state based at least in part on one or more behaviors monitored by security manager 170. In certain aspects, for the reasons set forth above (e.g., different VM configurations), not all VMs 120 always have the same behavior when executing the same candidate process. It will be further appreciated that not all VMs 120 execute all of the one or more candidate processes within the observation period, or at all.

An intended state may contain more or less data based in part on how long security manager 170 monitors the behavior of one or more VMs 120 executing one or more candidate processes. If security manager 170 monitors the behavior of one or more VMs 120 for a short observation period, the intended state may not be based on enough monitored behaviors. If security manager 170 monitors the behavior of one or more VMs 120 for a long observation period, then the intended state may be based on more than enough behaviors than are needed to detect a security threat, which is inefficient. Thus, in certain aspects, a candidate process is monitored by security manager 170 for an observation period of about two weeks; however, shorter and longer time frames are contemplated in the disclosure. For example, an observation period may be shorter (e.g., within one day) or longer (e.g., more than a month).

An observation period may be selected by an administrator (e.g., of computing system 150, cloud computing environment 160, security manager 170, and/or VMs 120). It will be appreciated that other selection means may be used to determine an observation period (e.g. a length of time to monitor one or more behaviors associated with a process, a length of time to monitor a certain amount of behaviors (e.g., 100 behaviors), a time period defined by machine learning (e.g., to determine how many behaviors are sufficient), a user defined observation period based on a balance of accuracy and/or efficiency (collectively, "observation selection parameters")). Thus, it will be apparent that an intended state stored in manager database 175 by security manager 170 may be based on security manager 170 monitoring a single behavior on a single VM 120, all behaviors on all VMs 120, or any iteration in-between. In certain aspects, security manager may generate a unique intended state for each of the VMs 120. In other aspects, an intended state is generated by security manager 170 using one or more of a previously generated intended state.

As discussed, in certain aspects, security manager 170 generates a digital profile of VM 120a in part by monitoring one or more behaviors of VM 120a using security appliance 195 over an observation period and storing information indicative of the one or more monitored behaviors as a digital profile of VM 120a in manager database 175. In certain aspects, a digital profile may also be referred to herein as including the one or more behaviors. In certain aspects security manager 170 uses an observation period of about five (5) minutes, but the observation period may be set for different intervals based on one or more observation selection parameters.

In certain aspects, detection system 180 accesses an intended state associated with VM 120a and a digital profile of VM 120a from manager database 175 and compares the digital profile to the intended state and determines if the digital profile is indicative of a security threat on VM 120a.

In certain aspects, detection system 180 determines that a digital profile contains information indicative of a behavior indicative of a security threat on VM 120a when the digital profile of VM 120a contains information indicative of a behavior that is not in an intended state associated with VM 120a. In other aspects, detection system 180 detects a security threat when one or more behaviors in the digital profile of a VM 120a is an outlier (e.g., using a holo-entropy based detection method) as set forth below.

Generally, entropy is a measure of the order (or consistency) of a plurality of data points in a data set. The lower the entropy the more consistent the data set is as a whole. Each data point in the data set contributes to the entropy of the data set. It will be appreciated that in certain aspects, if a data point A is consistent with the other data points in a data set, and data point B is inconsistent with the other data points in a data set, then data point B contributes more to a high entropy of the data set than data point A.

Holo-entropy is a technique for identifying one or more outliers (or unwanted behaviors) in a data set (e.g., a digital profile). Shu Wu and Shengrui Wang in Information-Theoretic Outlier Detection for Large-Scale Categorical Data, *IEEE Transactions on Knowledge and Data Engineering*, 2013, disclosed a "holo-entropy computation" to identify a user defined number of outliers (K) in a data set by identifying (K) data points that contribute most to the entropy of the data set.

With respect to detection system 180, a "data point" is information indicative of a behavior, and a "data set" is a group of information indicative of one or more behaviors (e.g., a digital profile, an intended state, behavior history, and/or a combination of one or more thereof). In certain aspects, detection system 180 used a holo-entropy computation to determine a (K) number of outliers in a data set. For example, if (K)=1, and behavior A from a digital profile of VM 120a contributes more to a high entropy of a data set than any other behavior in the data set, then detection system 180 may determine that behavior A is an outlier (e.g., a behavior indicative of a security threat on VM 120a). It will be appreciated that the holo-entropy computation can be repeated to determine the next largest outlier. In certain aspects, detection system 180 determines plurality of outliers (e.g., the ten biggest outliers will be classified as outliers in the data set).

In certain aspects, detection system 180 is configured to detect a security threat when it determines there is at least one outlier in a data set. It will be appreciated that when a VM 120 does not contain a security threat, configuring detection system 180 to detect a (K) number of outliers may result in a false positive determination of a security threat. Therefore, in certain aspects, detection system 180 is configured to detect a security threat when it detects at least one outlier (behavior) that satisfies a threshold (e.g., a behavior is considered to satisfy a threshold when the behavior deviates from a mean of the distribution of one or more behaviors in a data set by a certain percentage (e.g., 5%), or when a behavior is outside a certain standard deviation of the data set (e.g., more than a standard deviation factor away from the mean), also referred to as "mean and standard deviation computations."

It will be appreciated that the holo-entropy computation is computationally complex. Thus in certain aspects, detection system 180 uses a modified holo-entropy based approach referred to as "outlier factor computation" and an "outlier factor update computation" as set forth below.

It will be appreciated that a behavior includes one or more features (e.g., the remote address of the connection, the remote port number of the connection, the outbound or inbound connection type, local address of the connection, the local port number of the connection, and protocol information (e.g., TCP, UDP, etc.)). It will be appreciated that that the features of a behavior may be extracted and information indicative of the features stored as a Boolean operation as set forth below.

In certain aspects, detection system 180 uses an outlier factor computation to detect security threats. An outlier factor computation is a modified holo-entropy approach that returns a variable called an "outlier factor" or "OF" for each behavior in a digital profile. An OF is calculated by taking a data set X (e.g., an intended state and one or more behaviors from a digital profile) that includes information indicative of behavior x (e.g., a behavior from the digital profile) with m features (where the $i^{th}$ feature is represented by y') and is calculated by the following formula:

$$OF(x) = \sum_{i=1}^{m} \begin{cases} 0 \\ w_x(y_i) * \delta(n(x_i)) \end{cases} \text{ if } n(x_i) =$$

$$1 \text{ or else } w_x(y_i) = 2\left(1 - \frac{1}{1 + \exp(-H_x(y_i))}\right)$$

And $H_x(y_i)$ is the entropy value of $(y_i)$;
and $n(x_i)$ means the times $(x_i)$ appears in the $i^{th}$ feature;
and $\delta(x)=(x-1)\log(x-1)-x \log x$.

In certain aspects, after determining an OF indicative of each behavior and identifying behavior [x] as the behavior with the maximum outlier factor, the behavior may be removed and the outlier factor computation performed again. Additionally, or alternatively, once the maximum outlier factor $[x_0]$ is identified, detection system 180 may use the following equation to update the entropy for each behavior in the data set, and is referred to here as an outlier factor update computation:

$$H_{x|x_0|}(y_i) = (1+b)H_x(y_i) - \left[\left(\frac{a}{b} - a\right) \log a - (b+1) \log b\right] \text{ if } n(x_i) =$$

$$1 \text{ or else } -a \begin{cases} 0 \\ \delta(n(x_i)) \end{cases}$$

In certain aspects, detection system 180 uses an OF for determining if information indicative of behavior in a digital profile of a VM 120 is indicative of a security threat on VM 120. For example, in certain aspects, if there is a log normal distribution to a plurality of OFs generated from comparing a digital profile of VM 120 and an intended state associated with VM 120, then detection system 180 may use mean and standard deviation computations to select a threshold and determine if a behavior indicated in the digital profile is indicative of a security threat when an OF calculated from information indicative of the behavior satisfies the threshold. In other aspects, detection system 180 may utilize a clustering method to create multiple subsets (e.g., each subset comprising a log normal distribution) and further process each subset as set forth herein.

An intended state may be generated with a short observation period (e.g., three (3) days) by security manager 170 monitoring behavior data on a plurality of VMs 120 executing one or more candidate processes. Thus, it will be appreciated that an intended state generated with a short observation period may not include information indicative of all permissible behaviors. In this case, detection system 180 may return a false positive by identifying a previously unobserved permissible behavior as a security threat. Therefore in certain aspects, detection system 180 determines if there is a security threat on a VM 120 in part by only using (or analyzing) a subset of the information indicative of one or more behaviors (e.g., a subset comprising only information indicative of the features that return a "TRUE" value, and one or more features that return a "FALSE" value are ignored). It will be appreciated that in certain aspects, using a subset of information indicative of one or more behaviors can reduce the number of false positives.

In certain aspects, after detection system 180 determines that a digital profile of a VM is, or is not, indicative of a security threat on the VM, detection system 180 stores the security result in manager database 175. In certain aspects, security manager 170 accesses the security result by accessing manager database 175. It will be appreciated that in other aspects, detection system 180 notifies security manager 170 of a security result. In other aspects, security manager 170 accesses manager database 175 and accesses a security result based on certain parameters (e.g., periodically (e.g., every five (5) minutes), using a counter (e.g., linked to the creation of the a digital profile, linked to when detection system 180 accesses data from manager database 175), time of day, based on application parameters, in real time, etc.). It will be appreciated that in certain aspects a security result indicates the lack of a security threat.

In certain aspects, security manager 170 generates an alert in response to a security result (e.g., causing a notification to generate on the display of a VM 120, or another device (e.g. an administrator device (not shown)). In other aspects, generating an alert includes taking a remedial action (e.g., shutting down a process (e.g., a process associated with one or more behaviors used to generate a digital profile), turning off components, turning off one or more VMs and/or other devices, blocking all incoming or outgoing traffic from a VM, take a snapshot of the VM, blocking similar behaviors, etc.). In certain aspects, when detection system 180 generates a security result, security manager 170 requests a response from a VM 120 (e.g., generating an icon or activating a portion of user display of a VM 120) before allowing a process to continue. In certain aspects, security manager 170 will allow a process to continue after it receives a response from a VM 120 and/or an administrator (e.g., an icon was selected or a permission was granted). In other aspects, security manager 170 may take one or more remedial actions if security manager 170 does not receive a response. In certain aspects, security manager 170 communicates periodically, or in real time, status information (e.g., presence or absence of a security threat) to a VM 120. In other aspects, security manager 170 will display an icon (e.g., a text, a symbol, a color, and/or etc.) on a VM 120 associated with status information. In yet other aspects, security manager may indicate status information about a VM 120 to one or more other devices in computing system 150. In some aspects, a remediation broker (not shown) is connected to security manager 170 and is used to deploy security alerts by or on behalf of security manager 170 including taking one or more remedial actions.

In certain aspects, if a security threat is not detected on a VM 120 by detection system 180, security manager 170 may add information indicative of one or more behaviors to a behavior history associated with the VM 120 in training database 185 (e.g., for history-based detection using an intended state based behavior history). It will be appreciated that in certain aspects if a security threat is not detected by detection system 180, detection system 180 may add a subset of the information indicative of one or more behaviors (e.g., a subset of information indicative of one or more features of the one or more behaviors) to training database 185. In yet other aspects, detection system 180 does not add any information indicative of behaviors to training database 185 after comparing the digital profile of the VM 120 against the intended state associated with the VM 120.

Figure 2:
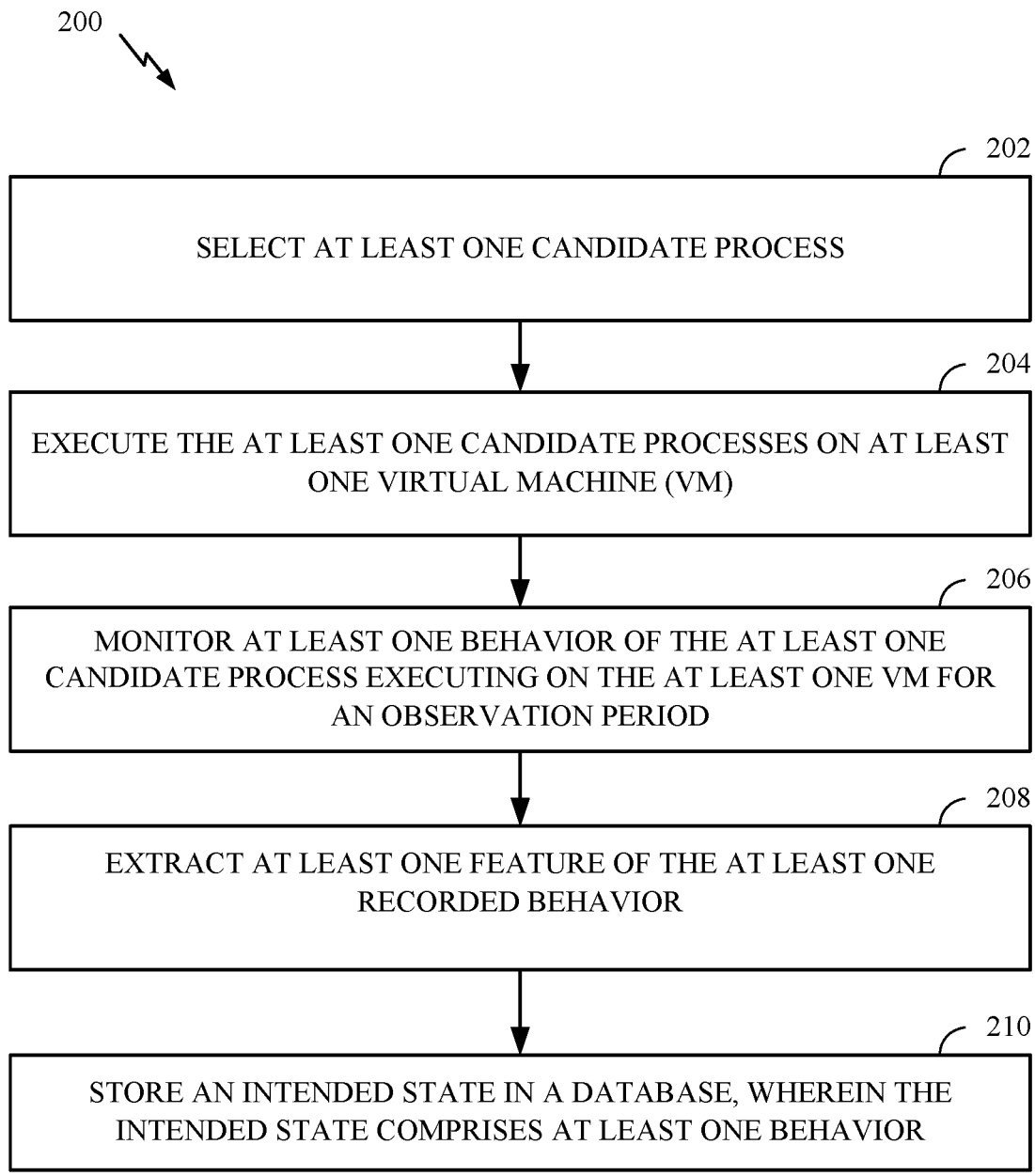
FIG. 2 is a flow diagram illustrating a process of generating an intended state in accordance with certain aspects on the disclosure.

FIG. 2 is a flow chart depicting a process 200 used to generate an intended state in accordance with certain aspects of the disclosure. At step 202 of process 200, at least one candidate process (e.g., an operating system process) is selected. In certain aspects, the at least one candidate process is selected by an administrator (e.g., an administrator of computing system 150, or cloud computing environment 160, security manager 170, VMs 120, etc.). In certain aspects, the at least one candidate process is at least one operating system processes selected based on a history of prior malicious use (e.g., Microsoft Windows operating system processes: lsass.exe; services.exe; spoolsv.exe; svchost.exe-k LocalService; svchost.exe-k netsvcs; svchost.exe-k NetworkService; svchost.exe-k utcsvc, etc.). It will be appreciated that other processes may be used within the scope of the disclosure (e.g., operating system process, application processes, network processes, etc.).

At step 204, the at least one candidate process is executed by at least one VM (e.g., VMs 120 in FIG. 1B). It will be appreciated that the at least one candidate process may be executed by a single VM or user device or a plurality of VMs and/or user devices. In certain aspects, the at least one candidate process is executed on a plurality of VMs that have a similar VM configuration. In other aspects, the at least one candidate process is executed on a plurality of VMs that have one or more different VM configurations.

Step 206, which in certain aspects occurs concurrently with step 204, includes monitoring by a security manager (e.g., security manager 170 in FIG. 1B) at least one behavior of the at least one VM executing the at least one candidate process. It will be appreciated that monitoring the at least one behavior of the at least one VM occurs over an observation period. During the observation period, the security manager may monitor all behaviors, or a subset of all behaviors. It will be appreciated that in certain aspects, the security manager monitors one or more behaviors by receiving information from a security appliance (e.g., security appliances 195, in FIG. 1B) and sent to the security manager. In other aspects, the security manager monitors at least one behavior of the at least one VM executing the at least one candidate process without the security appliance. As a non-limiting example, security manager 170 monitors: id|remote_address|remote_port|created_at|updated_at|allowed_behavior_id|connection_type|destination_service_id|created_by_id|local_address|local_port|protocol|origin, which in certain aspects, were recorded by the security appliance 195, respectively, as: 69082|10.250.0.2|389|2018-03-09 21:54:14.214-08|2018-03-09 31:54:14.214-08|16469|OUT|647|*|*|TCP|DISCOVERED.

In certain aspects, at step 206, security manager monitors a subset a behavior (e.g., certain features from all available features). As discussed above, features include information such as: the remote address of the connection (e.g., remote_address); the remote port number of the connection (e.g., remote_port); the outbound or inbound connection type (e.g., connection_type); local address of the connection (e.g., local_address); the local port number of the connection (e.g., local_port); and protocol information (e.g., TCP, UDP, etc.). It will be appreciated that in certain aspects, ports can be categorized by the security manager or the security appliance as one of a well-known port, ephemeral port, or another port.

Step 208, which in certain aspects occurs concurrently with step 206, includes extracting at least one feature of the at least one monitored behavior. In certain aspects, extracting the at least one feature from the at least one monitored behavior includes extracting a feature from information indicative of a behavior into a rule (e.g., Boolean operation (or binary rule)). It will be appreciated that each extracted feature may be used in an outlier factor computation and an outlier factor update computation as set forth above.

Step 210, which in certain aspects occurs concurrently with step 208, includes storing the intended state to a database (e.g., manager database 175), wherein the intended state includes information indicative of the at least one behavior comprising information indicative of the at least one feature extracted at step 208.

As a non-limiting example of process 200, an operating system process X is selected as a candidate process at step 202. At step 204, the operating system process X is executed on a VM A. At step 206, a security manager monitors at least one behavior of the operating system process X executing on VM A. At step 208, the security manager extracts at least one feature (e.g., one of the 24 features shown in Table 1 below) of the at least one behavior. In certain aspects, the security manager extracts a certain set of fixed features (e.g., features 1-12 in Table 1 below) for each monitored behavior. In other aspects, security manager extracts additional features that may be classified as not fixed (e.g., features 13-24 in Table 1) and may be defined according to their behavior, such as the number of inbound and outbound connections on a known port as explained below. For example, if operating system process X makes an outbound TCP connection on ports 1 and 2, and inbound UDP connection on port 3, then these three features can be extracted as, outgoingWellKnownTCPPort_1, outgoingWellKnownTCPPort_2, and inboundWellKnownUDPPort_3 as Boolean operations.

Table 1 below shows certain features extracted by the security manager at step 208 from a behavior of VM A executing a candidate operating system process X:

| Feature | Feature Name | Data Type |
|---|---|---|
| 1 | outgoingIPv4HasPublic | Boolean |
| 2 | outgoingIPv4hasPrivate | Boolean |
| 3 | outgoingIPv6hasPublic | Boolean |
| 4 | outgoingIPv6hasPrivate | Boolean |
| 5 | outgoingHasEphemeralTCPPort | Boolean |
| 6 | outgoingHasEphemeralUDPPort | Boolean |
| 7 | outgoingHasTCPOtherPort | Boolean |
| 8 | outgoingHasUDPOtherPort | Boolean |
| 9 | inboundHasEphemeralTCPPort | Boolean |
| 10 | inboundHasEphemeralUDPPort | Boolean |
| 11 | inboundHasOtherTCPPort | Boolean |
| 12 | inboundHasOtherUDPPort | Boolean |
| 13 | outgoingWellKnownTCPPort_X1 | Boolean |
| 14 | . . . | |
| 15 | outgoingWellKnownTCPPort_Xn | Boolean |
| 16 | outgoingWellKnownUDPPort_Y1 | Boolean |
| 17 | . . . | |
| 18 | outgoingWellKnownUDPPort_Yn | Boolean |
| 19 | inboundWellKnownTCPPort_Z1 | Boolean |
| 20 | . . . | |
| 21 | inboundWellKnownTCPPort_Zn | Boolean |
| 22 | inboundWellKnownUDPPort_P1 | Boolean |
| 23 | . . . | |
| 24 | inboundWellKnownUDPPort_Pn | Boolean |

As shown in Table 1 above, feature 1 [outgoingIPv4HasPublic] indicates that the operating system process X connected to an outbound public IPv4 address. In certain aspects, all of the features in Table 1 are stored as information indicative of one or more behaviors in an intended state. In other aspects, security manager determines at least one feature from Table 1 to store as information indicative of a behavior in an intended state. It will be appreciated that information indicative of a behavior may be stored in an intended state as information indicative of one or more features (e.g., as one or more Boolean operations as shown in the table above (e.g., returning a 1 (or "TRUE") value if the feature is present, and a 0 (or "FALSE) value if a feature is not present)).

Figure 3:
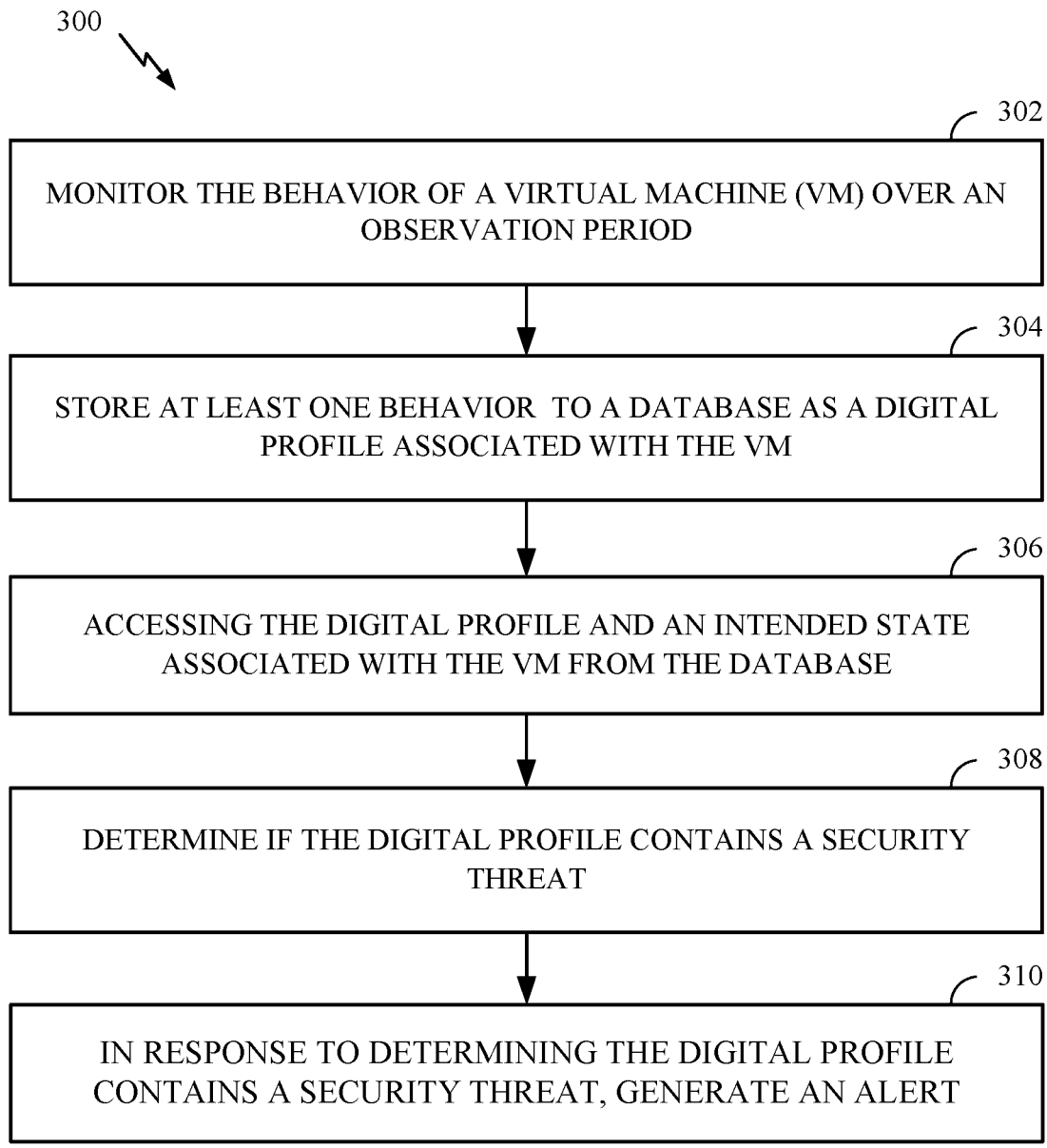
FIG. 3 is a flow diagram illustrating a process of detecting a security threat in accordance with certain aspects of the disclosure.

FIG. 3 is a flow chart depicting process 300 in accordance with certain aspects of the disclosure. In certain aspects, process 300 is used to identify a security threat in a computing system (e.g., computing system 150 in FIG. 1B). At step 302 in process 300, a security manager (e.g., security manager 170 in FIG. 1B) monitors the behavior of a VM (e.g., VM 120a in FIG. 1B) over an observation period. For example, a security manager may monitor the behavior of a VM executing an operating system process over an observation period of about 5 minutes. It will be appreciated that a security manager may monitor a subset of behaviors of a VM or all behaviors of the VM over the observation period. In certain aspects, the subset of behaviors includes at least one behavior with at least one feature associated with one or more processes (e.g., one or more operating system processes).

At step 304, the security manager stores information indicative of at least one behavior of the VM comprising information indicative of at least one feature into a database (e.g., manager database 175 in FIG. 1B) as a digital profile of the VM. It will be appreciated that the digital profile may be stored as a data set where information indicative of a feature of a behavior is stored as a Boolean operation. In certain aspects, storing information indicative of at least one behavior includes storing information indicative of the at least one behavior as more than one digital profile (e.g., a digital profile of the VM, and a digital profile for a plurality of VMs.). In certain aspects, the information indicative of the at least one behavior is combined with information indicative of the at least one other digital profile (e.g., from one or more additional VMs) and stored as one as a second digital profile.

At step 306, the digital profile of a VM is accessed by a detection system (e.g., detection system 180 in FIG. 1B) from a database (e.g., manager database 175 in FIG. 1B). At step 306, the detection system also accesses an intended state associated with the VM from database, which may be the same database (e.g., using the same database schema) or may be a different database.

At step 308, the detection system determines there is a security threat if the digital profile of a VM is indicative of a security threat on the VM (e.g., the digital profile contains an outlier). It will be appreciated that the results of any determination at step 308 may be made available to the security manager. In certain aspects, making the results available to the security manager includes causing the results of any determination to be recorded in a database (e.g., manager database 175 in FIG. 1B). At step 310, in response to the detection system determining that a digital profile contains a security threat, the security manager generates a security alert as set forth in the disclosure. In certain aspects, the security manager generating an alert includes causing a remediation broker to take a remedial action.

The various embodiments described herein may employ various computer-implemented operations involving data stored in computer systems. For example, these operations may require physical manipulation of physical quantities usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims.

What is claimed is:

1. A method of detecting a security threat in a computing system comprising:
monitoring by a security manager of the computing system, at least one behavior of at least one virtual computing instance (VCI) over an observation period;
storing by the security manager a digital profile in a first database, wherein the digital profile comprises information indicative of the at least one behavior;
accessing by a detection system, the digital profile from the first database;
accessing by the detection system, an intended state associated with the VCI from a second database, wherein the intended state comprises information indicative of one or more behaviors of a second VCI;
comparing at least a part of the digital profile to at least a part of the intended state; and
determining by the detection system, that the VCI contains a security threat when a behavior indicated in the digital profile is an outlier as compared to the intended state, wherein the behavior indicated in the digital profile is determined to be an outlier when the behavior, if removed from a data set comprising behavior indicated in the intended state and behavior indicated in the digital profile, would reduce an entropy of the data set by a threshold.

2. The method of claim 1, wherein another behavior indicated in the digital profile is an outlier when the other behavior is not indicated in the intended state.

3. The method of claim 1, wherein another behavior indicated in the digital profile is an outlier based in part on an outlier factor, and wherein the outlier factor is based in part on an outlier factor computation of the data set.

4. The method of claim 3, wherein the outlier factor computation comprises:
determining a first outlier factor for a first behavior indicated in the digital profile using an outlier factor computation; and
determining a second outlier factor for a second behavior indicated in the digital profile using an outlier factor update computation.

5. The method of claim 1, wherein determining by the detection system that the VCI contains a security threat when a behavior indicated in the digital profile is an outlier further comprises one or more of:
generating by the security manager a security alert or causing a remediation broker to take a remedial action.

6. The method of claim 1, wherein the information indicative of the one or more behaviors of the second VCI is based in part on an operating system process.

7. The method of claim 1, wherein comparing at least a part of the digital profile to at least a part of the intended state is based at least in part on comparing features that are present in the intended state and ignoring features that are only present in the digital profile.

8. The method of 1, wherein an intended state is generated by:
executing at least one candidate process on the second VCI;
monitoring the one or more behaviors of the second VCI executing the at least one candidate process for an observation period;
extracting at least one feature from the one or more behaviors; and
storing information indicative of the one or more behaviors comprising the at least one feature as the intended state in the second database.

9. A non-transitory computer readable medium comprising instructions to be executed in a processor of a computer system, the instructions when executed in the processor cause the computer system to carry out a method of detecting a security threat in a computing system comprising:
monitoring by a security manager of the computing system, at least one behavior of at least one virtual computing instance (VCI) over an observation period;
storing by the security manager a digital profile in a first database, wherein the digital profile comprises information indicative of the at least one behavior;
accessing by a detection system, the digital profile from the first database;
accessing by the detection system, an intended state associated with the VCI from a second database, wherein the intended state comprises information indicative of one or more behaviors of a second VCI;
comparing at least a part of the digital profile to at least a part of the intended state; and
determining by the detection system, that the VCI contains a security threat when a behavior indicated in the digital profile is an outlier as compared to the intended state, wherein the behavior indicated in the digital profile is determined to be an outlier when the behavior, if removed from a data set comprising behavior indicated in the intended state and behavior indicated in the digital profile, would reduce an entropy of the data set by a threshold.

10. The non-transitory computer readable medium of claim 9, wherein another behavior indicated in the digital profile is an outlier when the other behavior is not indicated in the intended state.

11. The non-transitory computer readable medium of claim 9, wherein another behavior indicated in the digital profile is an outlier based in part on an outlier factor, and wherein the outlier factor is based in part on an outlier factor computation of the data set.

12. The non-transitory computer readable medium of claim 11, wherein the outlier factor computation comprises:
determining a first outlier factor for a first behavior indicated in digital profile using an outlier factor computation; and
determining a second outlier factor for a second behavior indicated in the digital profile using an outlier factor update computation.

13. The non-transitory computer readable medium of claim 9, wherein determining by the detection system that the VCI contains a security threat when a behavior indicated in the digital profile is an outlier further comprises one or more of:
generating by the security manager a security alert or causing a remediation broker to take a remedial action.

14. A computer system comprising:
a first host that includes:
a processor; and
a non-transitory computer readable medium having stored thereon program code that, when executed, causes the processor on the first host to:

monitor at least one behavior of at least one virtual computing instance (VCI) over an observation period;

store a digital profile in a first database, wherein the digital profile comprises information indicative of the at least one behavior; and a second host that includes:
   a processor; and
   a non-transitory computer readable medium having stored thereon program code that, when executed, causes the processor on the second host to:

access the digital profile from the first database;

access an intended state associated with the VCI from a second database, wherein the intended state comprises information indicative of one or more behaviors of a second VCI;

compare at least a part of the digital profile to at least a part of the intended state; and determine that the VCI contains a security threat when a behavior indicated in the digital profile is an outlier as compared to the intended state, wherein the behavior indicated in the digital profile is determined to be an outlier when the behavior, if removed from a data set comprising behavior indicated in the intended state and behavior indicated in the digital profile, would reduce an entropy of the data set by a threshold.

15. The computing system of claim 14, wherein another behavior indicated in the digital profile is an outlier when the other behavior is not indicated in the intended state.

16. The computing system of claim 14, wherein another behavior indicated in the digital profile is an outlier based in part on an outlier factor, and wherein the outlier factor is based in part on an outlier factor computation of the data set.

17. The computing system of claim 16, wherein the outlier factor computation comprises:
   determining a first outlier factor for a first behavior indicated in the digital profile using an outlier factor computation; and
   determining a second outlier factor for a second behavior indicated in the digital profile using an outlier factor update computation.

* * * * *